US009286362B2

(12) United States Patent
Lotikar et al.

(10) Patent No.: US 9,286,362 B2
(45) Date of Patent: Mar. 15, 2016

(54) SYSTEM AND METHOD TO CUSTOMIZE METADATA FOR DIFFERENT USERS RUNNING ON THE SAME INFRASTRUCTURE

(75) Inventors: Rohit M. Lotikar, Bangalore (IN); Qian Ma, Beijing (CN); Daniel V. Oppenheim, Hawthorne, NY (US); Ramana V. Polavarapu, Bangalore (IN); Krishna C. Ratakonda, Hawthorne, NY (US); Biplav Srivastava, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1439 days.

(21) Appl. No.: 12/567,430

(22) Filed: Sep. 25, 2009

(65) Prior Publication Data

US 2011/0078204 A1    Mar. 31, 2011

(51) Int. Cl.
*G06F 7/00* (2006.01)
*G06F 17/30* (2006.01)

(52) U.S. Cl.
CPC .... *G06F 17/30569* (2013.01); *G06F 17/30392* (2013.01); *G06F 17/30587* (2013.01); *G06F 17/30997* (2013.01)

(58) Field of Classification Search
CPC .................... G06F 17/30864; G06F 17/30867; G06F 17/30067; G06F 17/00038; G06F 17/3082; G06F 17/30672; G06F 17/30707; G06F 17/30731; G06F 17/30734; G06F 17/30634; G06F 17/30929; G06F 17/30997
USPC ................................................. 707/707, 705
See application file for complete search history.

(56) References Cited

U.S. PATENT DOCUMENTS

| 5,761,662 | A  | * | 6/1998 | Dasan |
| 6,760,721 | B1 |   | 7/2004 | Chasen et al. |
| 6,782,394 | B1 |   | 8/2004 | Landeck et al. |
| 6,877,002 | B2 |   | 4/2005 | Prince |
| 6,976,039 | B2 |   | 12/2005 | Chefalas et al. |
| 7,401,064 | B1 | * | 7/2008 | Arone et al. |
| 2005/0273812 | A1 | * | 12/2005 | Sakai .............................. 725/35 |
| 2008/0104032 | A1 | * | 5/2008 | Sarkar ............................... 707/3 |
| 2009/0164387 | A1 | * | 6/2009 | Armstrong ............ G06F 17/241 705/36 R |
| 2009/0254572 | A1 | * | 10/2009 | Redlich .................. G06Q 10/06 |
| 2010/0070448 | A1 | * | 3/2010 | Omoigui ............. H01L 27/1463 706/47 |
| 2010/0106672 | A1 | * | 4/2010 | Robson et al. .................. 706/50 |

\* cited by examiner

*Primary Examiner* — Angelica Ruiz
(74) *Attorney, Agent, or Firm* — Scully, Scott, Murphy & Presser, P.C.; Daniel P. Morris, Esq.

(57) ABSTRACT

A metadata management system and method enables complex query searches by users, e.g., different users having different query needs, using the same infrastructure. For querying metadata, the metadata management system provides functionality for aggregating all the concepts (metadata items) and relationships of the metadata across one or more users in a common format; extracting concepts and storing them in a metadata store (e.g., a relational database); extracting relationships and modeling them in a standard semantic representation. The system and method further records users' different needs on relationships into user-specific configuration files. The system is configured for retrieving, in response to a user query, relevant data items by using the meta-data selectively. In one embodiment, a selection of meta-data used in the retrieving is determined according to captured context information.

19 Claims, 7 Drawing Sheets

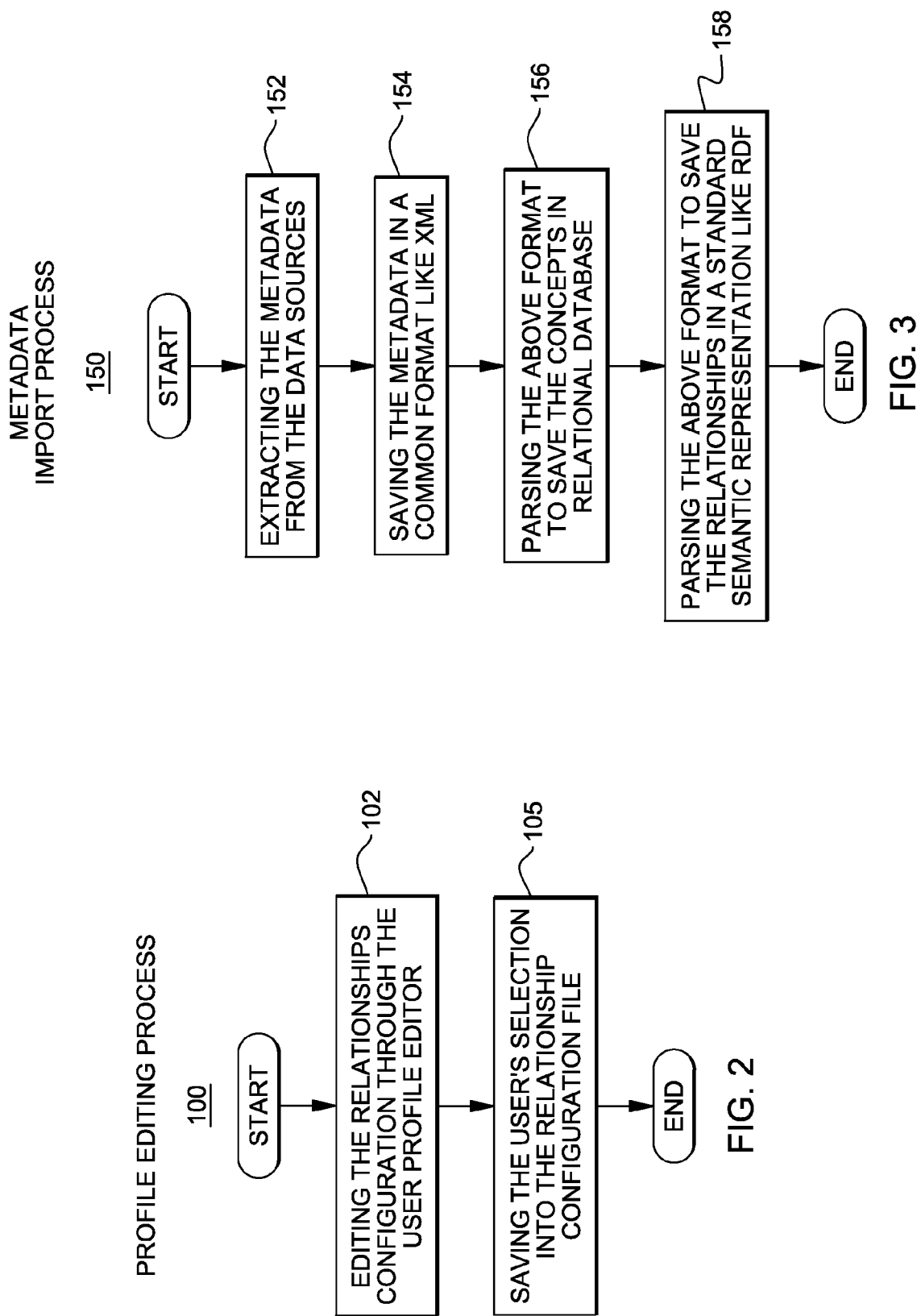

SYSTEM AND METHOD TO CUSTOMIZE METADATA FOR DIFFERENT USERS RUNNING ON THE SAME INFRASTRUCTURE

BACKGROUND

This invention relates generally to metadata searching in storage and retrieval systems and, particularly, an enhanced system and method to customize the metadata for different users running on the same computing environment A common task across many domains is to retrieve information from a repository, e.g., a memory storage device such as a database. The information retrieval system and method becomes more important today given the sheer volume of data in the repository. Usually, the retrieval process starts when the user submits a query, and then the repository management system searches the repository based on keywords in the query to return matched records. The full-text search way performs poorly in the situations where the amount of data is very large. Such repository management systems are also inclined to misunderstand the semantics of keywords when they cover multiple subject areas.

One improvement to the information retrieval today is associating meta-data that is relevant to the user needs with data elements in the repository. Metadata is commonly defined as the data about data. For instance, for a document, metadata may include information such as who wrote the document, when it was published and what especially it discusses etc. All these kinds of information can be described in the metadata of this document. Therefore, the metadata may have clearer semantics and include some category information to organize the data in the repository. Even more, the relationships among different metadata items may be involved to describe more complex semantics. Obviously, the query on metadata is more effective to retrieve appropriate results than the full-text search, especially for some specific areas difficult to apply the full-text search, such as multimedia. However, accompanying with the fast increase on the amount and complexity of metadata, the effective search on metadata also becomes difficult. On the other hand, different users may have different metadata usages in a distributed environment. Some need performance but do not care for inter-concept relationships, e.g., glossaries. Some need rich relationships to guarantee high recall/handle complex queries even if performance may be slower, e.g., asset retrieval, searching for work requests, and assigning work requests to individuals or teams based on capabilities. In other words, there is a trade-off among different objectives from the users' queries, and the infrastructure must be configured to optimize based on user needs. For instance, such objectives need to be optimized:

Performance—How quickly can the data be retrieved

Precision—Of the data that is retrieved, what fraction of it is relevant to the users needs Recall—What fraction of the relevant data was retrieved.

Previous metadata storing formats that are configured to give performance do not support relationships. Additionally, ontology systems that allow relationships currently do not allow configuring relationships based on different users of the same metadata system.

It would be desirable to provide an optimization for a system and method that addresses the aforesaid various search requirements of different users who may have different metadata usages.

Particularly, it would be desirable to provide a system and method that customizes metadata for different users running on the same infrastructure to attain an effective search on metadata.

Moreover, it would be highly desirable to provide a system and method that supports the customization on different types of relationships in metadata to balance various factors in search according to different users' needs.

SUMMARY

There is provided a system and method for customizing the relationships among metadata items for different users when they include these relationships in the metadata query.

In one aspect, there is provided a unified approach to enable different users to customize the inter-concept relationships based on their searching needs, and, to provide flexible metadata matching based on incorporated relationships.

In one aspect of the invention, there is provided a system and method for customizing the relationships among metadata items for different users when they include these relationships in the metadata query. In one aspect, there is provided a unified approach to address the following problems collectively: 1) How to allow different users to customize the inter-concept relationships based on their searching needs; and, 2) How to provide flexible metadata matching based on incorporated relationships.

In an embodiment there is disclosed a system and method for customizing the relationships among metadata items for different users when they include these relationships in the metadata query. The system comprises:

a memory storage device defining a meta-data repository that stores at least one meta-data item belonging to each of an element and a relationship type meta-data;

a processor device in communications with the memory storage device, wherein the system is capable of performing a method comprising:

storing, in a meta-data repository, at least one meta-data item belonging to each of an element type and a relationship type meta-data;

storing at least one data item in a data repository;

capturing a relationship between the at least one meta-data item and a data item including the context in which the relationship was generated; and, retrieving, in response to a user query, relevant data items by using the meta-data selectively, a selection of meta-data used in the retrieving is determined according to the captured context information.

In another embodiment there is provided data retrieval method comprising:

storing, in a meta-data repository, at least one meta-data item belonging to each of an element type and a relationship type meta-data;

storing at least one data item in a data repository;

capturing a relationship between the at least one meta-data item and a data item including the context in which the relationship was generated;

retrieving, in response to a user query, relevant data items by using the meta-data selectively, a selection of meta-data used in the retrieving is determined according to the captured context information, wherein a processor unit runs a program to execute one or more of the storing, capturing and retrieving.

In a further embodiment, there is provided computer program product for retrieving data, the computer program product comprising:

a storage medium readable by a processing circuit and storing instructions for execution by the processing circuit for performing a method comprising:

storing, in a meta-data repository, at least one meta-data item belonging to each of an element type and a relationship type meta-data;

storing at least one data item in a data repository;

capturing a relationship between the at least one meta-data item and a data item including the context in which the relationship was generated;

retrieving, in response to a user query, relevant data items by using the meta-data selectively, a selection of meta-data used in the retrieving is determined according to the captured context information, wherein a processor unit runs a program to execute one or more of the storing, capturing and retrieving.

BRIEF DESCRIPTION OF THE DRAWINGS

The invention may be understood by reference to the following description taken in conjunction with the accompanying drawings, in which like reference numerals identify like elements, and in which:

FIG. 2 shows a profile editing process 100 for the creating or editing of configured relationships;

FIG. 3 shows the metadata import process 150 performed by the management system according to one embodiment;

DETAILED DESCRIPTION

Figure 1:
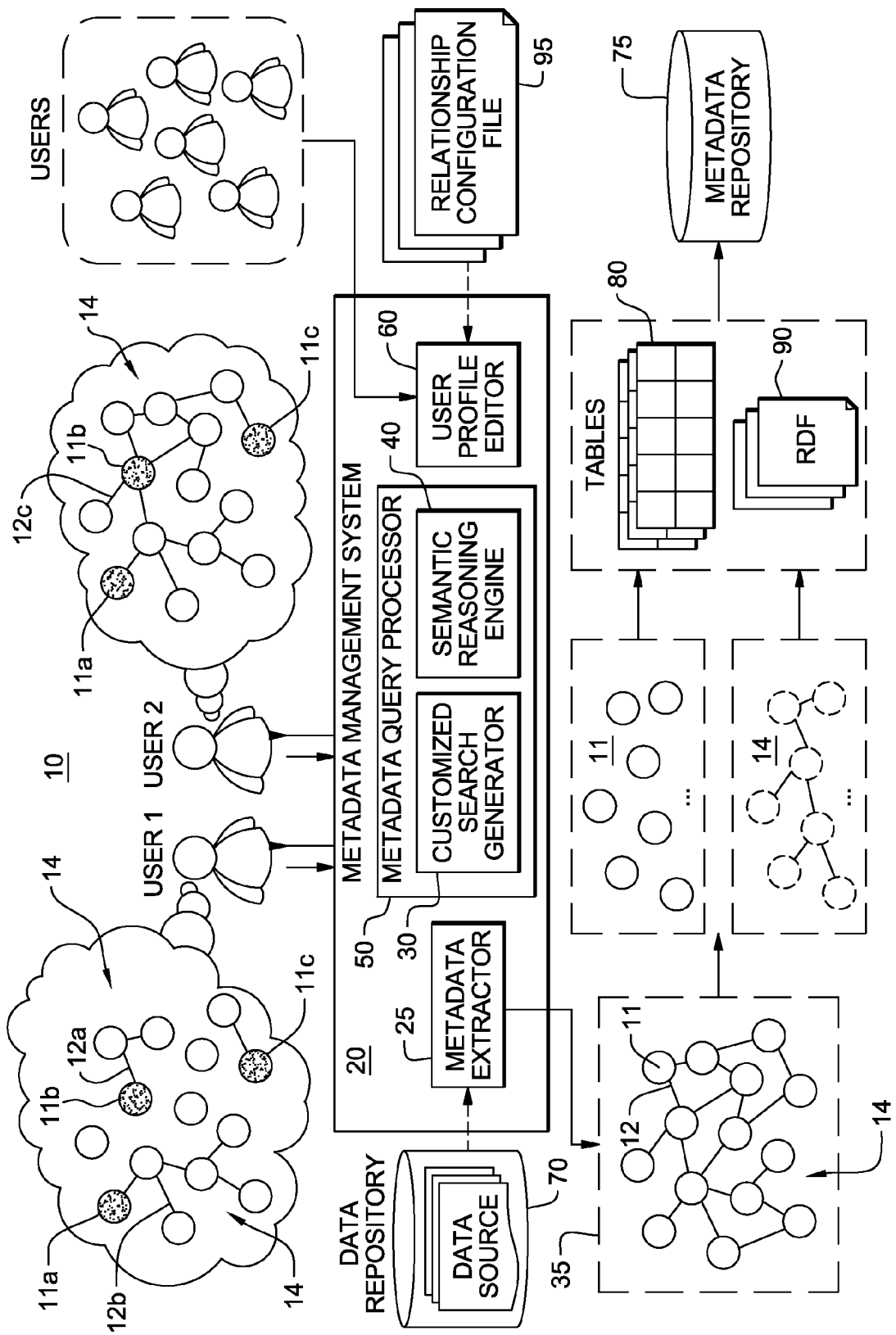
FIG. 1 shows a block diagram of a computing infrastructure 10 in which the metadata management system is implemented.

A metadata management system and method is provided that enables complex query searches by users, e.g., different users having different query needs, using the same infrastructure. For querying metadata, the metadata management system provides functionality for aggregating all the concepts and relationships of the metadata across one or more users in a common format; extracting concepts and storing them in a metadata store (e.g., a relational database); extracting relationships and model them in a standard semantic representation. The system and method further records users' different needs on relationships into user-specific configuration files.

To implement a query, the metadata management system and method retrieves concepts from the metadata store using store's query language (e.g., SQL) to get the candidate concepts; retrieves relevant relationships based on users' configurations and candidate concepts; and, makes use of standard semantic matching (e.g., using an RDF) to filter the result. Based on the above steps, a new capability on customizing the metadata for different users is provided.

In the manner as described in detail below, in one embodiment, a metadata management system and method is provided that allows different users to select different types of relationships (including none) to balance expressivity of a search with different factors, such as performance, precision, recall etc. The system provides flexible metadata matching based on incorporated relationships (the meta-data is flexible in the sense that it incorporates operational context and can be customized either automatically, or by users); and, makes operational context available in two senses—when the data was tagged with the meta-data and, the context in which it is being retrieved.

The metadata management system of a preferred embodiment, provides the ability to find the right intersection between two contexts to drive a search.

As referred to herein, the term "Meta-data", although commonly defined as the data about data, can have many meanings including, but not limited to: System behavior: performance, precision, recall; Operational context: when the metadata was inserted, how it was inserted (process context), by whom it was inserted, how it is deemed to be useful (industry, sector); and, Change over time (historical or future trends) as a meaningful indicator to facilitate search.

The metadata consists of metadata items. The metadata items may have relationships between each other. An ontology system may be used to describe the metadata, e.g., as described in http://en.wikipedia.org/wiki/Ontology_(information_science). Therefore, a metadata item is a concept in the ontology. Using ontology to describe the metadata enables use of an existing semantic reasoning engine to perform the query based on the relationships between concepts. Example queries are as follows: 1) Find all relationships involving "Code-And-Unit-Testing" concept; 2) Find (instances of concept) "Employees" for "Code-And-Unit-Testing" concept where concept "Skill"=Average. These queries are posed in terms of concepts and relationships. Anyone competent in RDF standard can convert such a query to a SPARQL Query (an RDF query language standard) based on the RDF representation of the metadata. The same example can be represented in a relational table format and SQL query be posed by an artisan skilled in database technologies.

FIG. 1 shows a block diagram of a metadata management system 20 employed in a computing infrastructure 10. The metadata management system 20 provides an interface in which users such as User1 and User 2, interact to conduct searches among data sources either coupled to and/or remotely accessible from a data repository 70. In one embodiment depicted, the metadata management system 20 includes: a metadata extractor module 25, a metadata query processor 50 having Customized Search Generator 30 and, Semantic Reasoning Engine 40 components, and, a User Profile Editor 60 for specifying relationship configurations.

The metadata extractor module 25 in the management system performs capturing of the metadata from data sources that, e.g., may be stored in a data repository 70 whether centralized or remotely located. Metadata includes concepts, represented as circles 11, and relationships, represented as a specified or captured interconnection 14 of concepts (e.g., data items and metadata items or among metadata items) as shown interconnected by lines 12. Concepts describe attributes of data sources or the context of a metadata item provided as a result of a creation/update/query or deletion operation performed by the system; and relationships describe the connection between the data item and metadata item or the connection among different metadata items. The metadata management system handles each of these concepts 11 and relationships 12 separately. FIG. 3 depicts a metadata import process 150 performed by the management system. In operation, the system extracts all of the metadata from the data sources, 152, and records all the resultant data item/metadata concepts 11 and their relationships 14 based on the query into a common format, such as can be represented by an XML file 35 (e.g., specified as XML 1.0 (5$^{th}$ edition) found http://www.w3.org/TR/xml, wholly incorporated by reference herein), or like mark-up language data structure, 154. Then a parsing operation 156 is performed to these XML files 35 resulting in the system storing 158 of data representing concepts 11 into relational database's tables 80. The parsing operation 158 further results in the system saving relationships 14 in a semantic support representation as in a Resource Description Framework (RDF) 90 which RDF suite of specifications (www.w3.org/RDF) is incorporated by reference as if fully set forth herein. The information from these components 80, 90 is constructed into a metadata repository 75 for use by the management system 20. In summary, this metadata repository stores concept types, stores relationships among concept types including, in one embodiment, the users interested, and along with contexts for metadata item creation/update/query/deletion; and, further stores relationships between concept types and (select) data instances with, as before, the users interested and/or, along with contexts for creation/update/query/deletion.

In operation, the user profile editor opens a user interface or a graphical user interface to let users, via an attached, local or remotely connected user device, specify what kinds of relationships 14 they want to consider during data queries. The entire set of relationships is retrieved from the metadata repository 75, and users select a subset of these relationships according to their requirements. The user's selection is recorded as a profile for that user and maintained by the management system. FIG. 2 shows a profile editing process 100 including the creating or editing of configured relationships via the user interface 102, and, saving the user's selection, at 105, in a relationship configuration file such as relationship configuration file 95 shown in FIG. 1.

Figure 7:
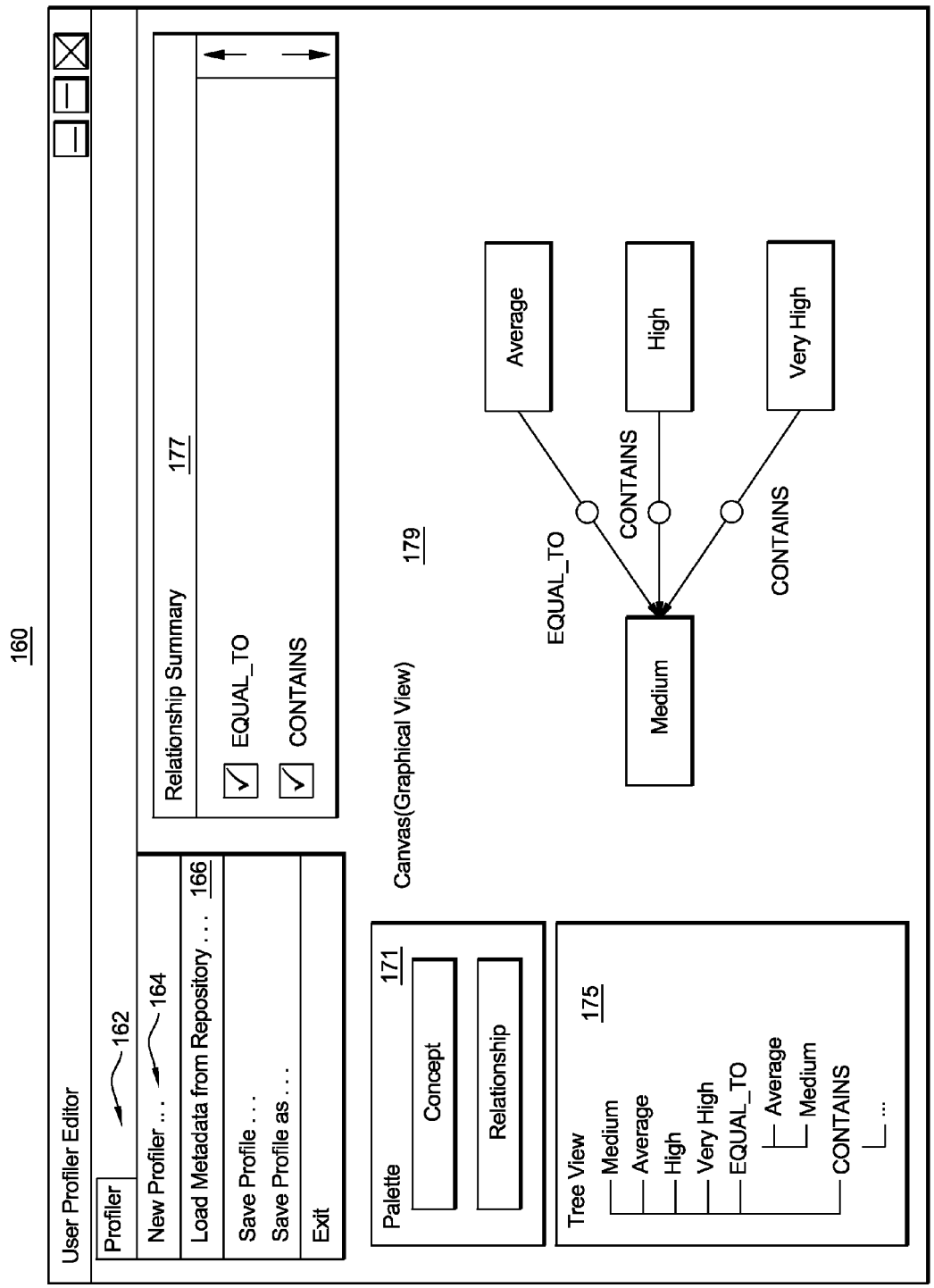
FIG. 7 illustrates a user profile editor interface 160 according to an example embodiment; and, FIG. 8 illustrates an exemplary hardware configuration of a computing system 400 in which the metadata management system may be employed.

More particularly, FIG. 7 illustrates a user profile editor interface 160 according to an example embodiment in which a user may specify concepts and relationships among data types and metadata or among metadata. It is understood that the user profile interface may comprise a drawing tool or domain/ontology modeling tool, e.g., such as the Protégé (http://protege.stanford.edu/). As shown via the user profile editor interface 160, the user may select an existing profile 162, select a new profile 164 in which the interface provides functionality for creating a new user profile including concept and relationship preferences, or, load metadata from the repository 166. A user may select a palette button 171 to present to the user via the interface all concepts and relationships (taken from the metadata repository). A tree view 175 showing concepts and relationships may be additionally presented from which a user may select to configure a profile. A summary 177 of relationships selected may be additionally provided for the user, and, a graphic view 179 corresponding to the tree view 175 may additionally be presented.

Using this profile allows a user to start from one point in the space of performance, precision and recall and then switch to another one over time without disruptive change to the metadata repository. The user only needs to re-configure his selection in the profile file and this re-configuration will be applied into the future query from this user. Without loss of generality, a user can also have multiple profiles and switch among them as his or her need dictates. The system may also provide default user profiles. For example, a team member can inherit the user profile of the team lead. Subsequently, a team member can edit according to his or her requirements. Thus, if there is a change in the user profile in the question, the system generates new search results and the user sees new results added (or removed) to the results he or she may have been getting earlier. The system in this scenario may generate an enhanced query interface for presenting the new results based on a changed profile. The system is able to seamlessly switch dynamically.

That is, while the user profile defines what kinds of relationships should be considered during the user's query, it can be changed during runtime, i.e., the user can add/remove relationships that user is interested into/from his profile. Since the query results depends on what kinds of relationships are selected, the user will see the results changed based on the latest user profile. To be a more advanced feature, the user can preview the profile change in the query interface before that user executes the search. In other words, the user can see what kinds of new relationships have been included into the profile, and what kinds of old relationships have been removed. The user may additionally be able to see the possible results change in the interface. For example, when some relationship(s) is(are) removed, the query results based on these relationships will disappear. When new relationship(s) are added, new results based on these relationships will be obtained. The query does not have to be re-executed if the relationships are unchanged which leads to enhanced performance. The components of the system do not need to be changed to support user profile editing since what relationships should be considered are not hard-coded into the system. They are recorded by the user profile. Therefore, the relationships can be dynamically selected during runtime.

The customized search generator 30 of the metadata query processor provides the sub-search space of the user after that user defines what kinds of relationships he/she wants to include in a search. In the example metadata management system 20 shown in FIG. 1, there can be many kinds of relationships. In the non-limiting example depicted, a user depicted as "user1" enters a query based on three concepts 11*a*, 11*b*, 11*c*, as depicted in FIG. 1, and user1 specifies he/she will consider certain relationships such as relationships 12*a*, 12*h* from that user's profile. Therefore, the user1 will obtain such a search result based on the example data space. Further in FIG. 1, a second user, "user2" enters a query based on three concepts 11*a*, 11*b*, 11*c*, as depicted in FIG. 1, however, as user2 has specified an additional relationship 12*c*, from that user2's profile, that user will obtain another result. An example resultant sub-search space is shown in FIG. 6 and described in greater detail herein.

Figure 4:
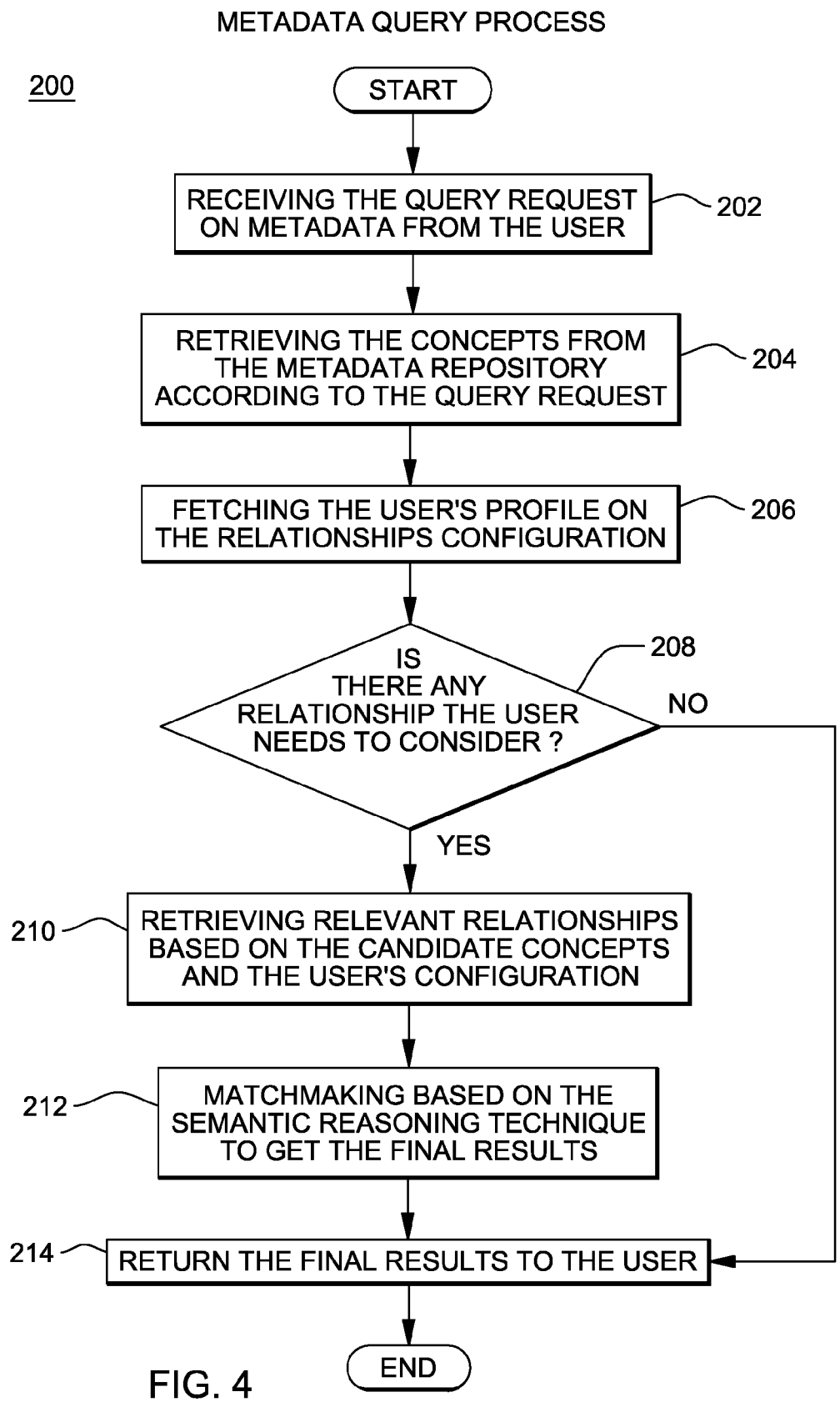
FIG. 4 shows the metadata query process 200 performed by the management system according to one embodiment.

In operation, as depicted in the metadata query process 200 depicted in FIG. 4, the Customized Search Generator 30 receives the user's query, 202, and it will retrieve concepts from the from relational database's tables of the metadata repository based on the request, 204, for example, using a relational query language (e.g., SQL) in order to get candidate concepts. After that, the generator looks for the user's profile, 206, and parses it to understand what kinds of relationships the user wants to involve. A determination is made at 208 to determine if there is any relationship the user needs to consider. If there is no relationship selected in the user profile to be considered in the current query, the query becomes a keyword-based query like previous search methods. It will return the results that exactly match the concepts. If there is a relationship the user needs to consider, then, at 210, the generator retrieves relevant relationships based on the user's profile and the candidate concepts from the first step (e.g., using an SQL-type query).

Similarly, since what kinds of relationships are used is dynamically determined by the user's profile, the user could change the results (change his/her decision) by real-time modifying his/her profile. For example, with reference to the detailed method shown in FIG. 4, the several phases, for example, comprising one or more blocks in FIG. 4 are implemented: In a first Phase 1: Receiving the input query, e.g., "Employees" for "Code-And-Unit-Testing" concept where concept "Skill"=Average; Phase 2: Expanding the query based on user profile. For example, profile of FIG. 7 (defining EQUAL_TO relationship to "Medium") can be chosen or deleted; Phase 3: Running the query. The query does not give a result if profile of FIG. 7 (defining EQUAL_TO relationship to "Medium") is deleted. The query gives a result if profile of FIG. 7 (defining EQUAL_TO relationship to "Medium") is chosen and now, Average (skill concept) is inferred to be the same as Medium. This demonstrates that changing the profile changes the query, and hence the result.

Figure 5:
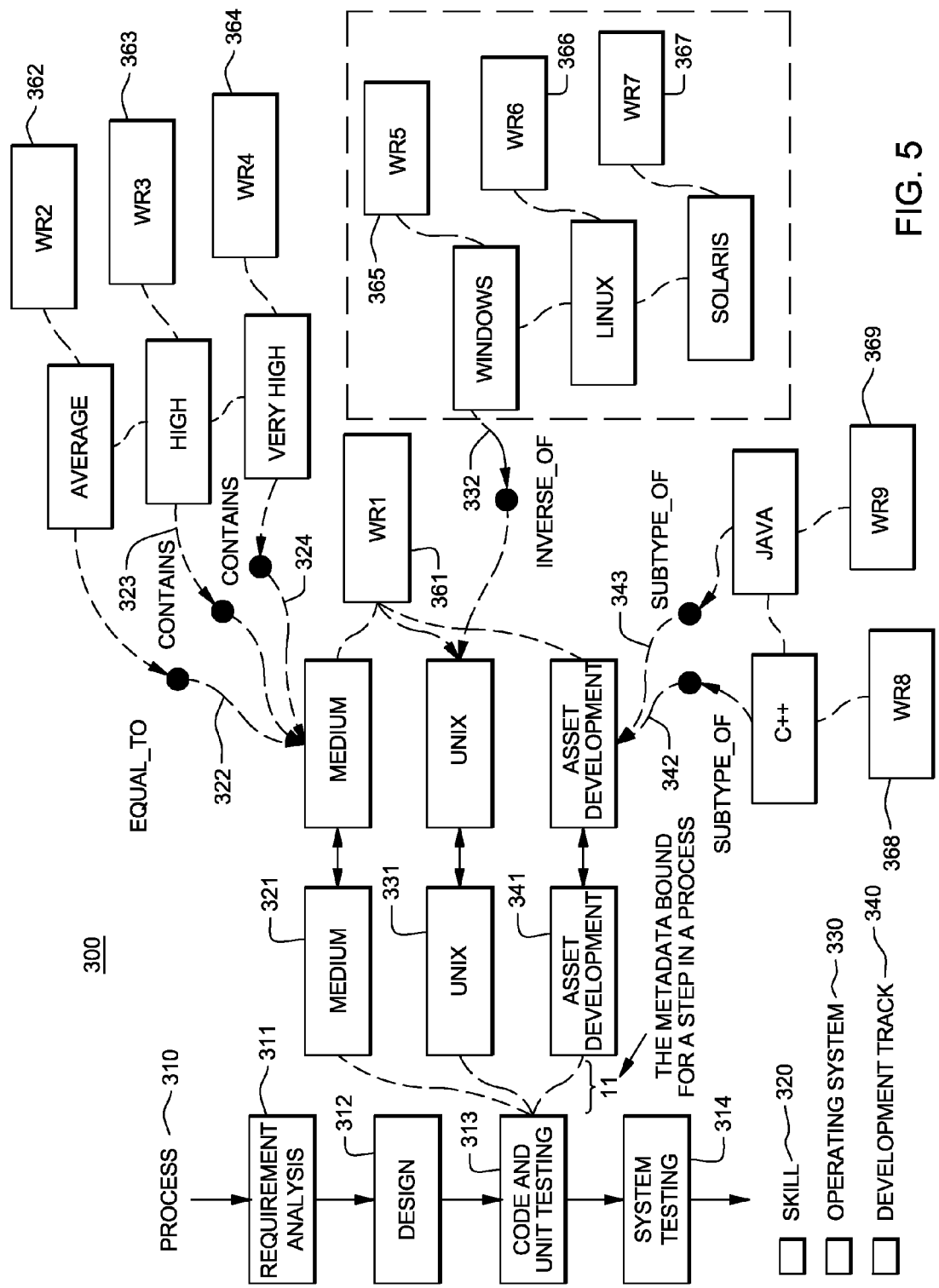
FIG. 5 illustrates an example search including a complex query conducted using the metadata management system in one embodiment.
Figure 6:
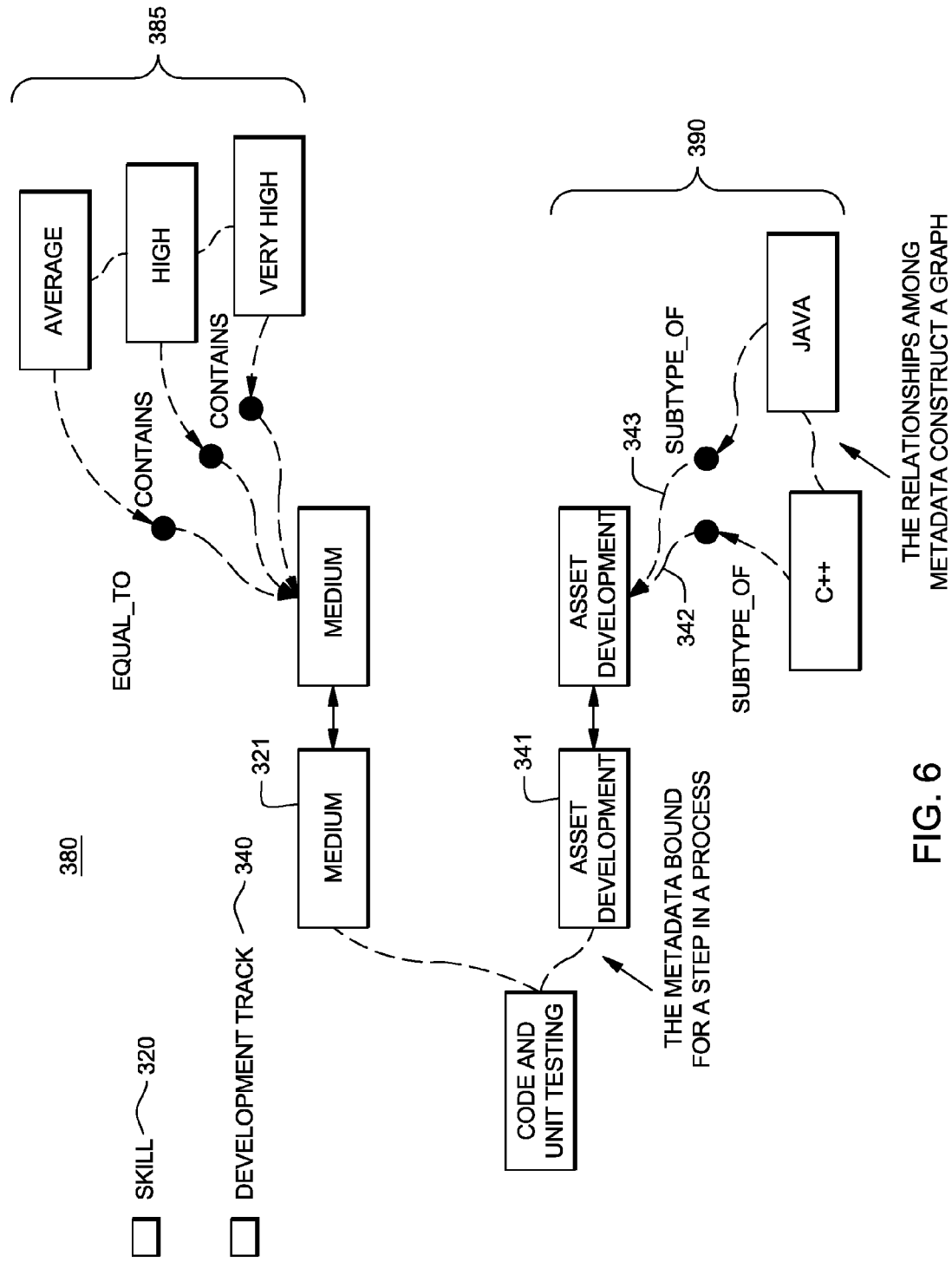
FIG. 6 illustrates an example sub-search space including results of a complex query conducted using the metadata management system in one embodiment.

Finally, the generator would obtain a sub-graph as the search space for this query as described by way of example in connection with FIGS. 5 and 6. The Semantic Reasoning Engine 40 then receives the search space of the user's query, and at 212 performs a matchmaking based on user profile configuration and candidate concepts to generate the final query results 214. The query itself can be SQL or RDF. One skilled in the art of RDF or databases would be able to transform these into a corresponding representation, such as shown in FIGS. 5 and 6. Since metadata has more formal semantics and the relationships among metadata items help to categorize the hierarchy of metadata, semantic techniques facilitate achieving better query results than a purely syntactic search method. The results are returned to the user through a graphical user interface or a specified response format.

As an example illustration of the present invention, there is considered a work request search 300 in a collaborative development environment, as shown in FIG. 5. In the example implementation of the metadata management system, a work request is a self-contained task set which is going to be delivered to an appropriate team. Metadata items may be specified and included such as, but not limited to: skill 320, operating system 330 and development track 340, etc. Also, there may be specified relationships, such as, but not limited to: EQUAL_TO, CONTAINS, INVERSE_OF and SUBTYPE_OF etc., among metadata items. It is understood that users can define many kinds of relationships between the metadata when they store them into the metadata repository. The users just need to configure what relationships they would like to consider in their queries to the repository. Some other relationship examples may be LARGER_THAN, SMALLER_THAN, etc.

In the example search 300 shown in FIG. 5, a software development process 310 may include the following phases: a requirement analysis 311, design 312, code and unit testing 313, and system testing 314. In the code and unit testing phase 313, for example, it is desired to search an appropriate work request to specify the task sets. The requirements in the query are, for example, as follows: the skill is "Medium" 321, the operating system is "Unix" 331 and the development track is "Asset Development" 341. A "basic" query may be conducted that is based on the literal search in the relational database. It will get the best performance, but it only can retrieve work requests exactly matching the requirements indicated as a first (work request) result 361.

A more complex query operation is performed by the metadata management system 20 that considers the inter-concept relationships 14 among metadata 11. The user may customize which kinds of relationships 14 should be taken into account. The result set is different according to the customization. For instance, when considering a relationship EQUAL_TO 322 in the semantic search method, it may be found that "Average" in the skill 320 is the same as "Medium" leading to a further example work request result 362, shown in FIG. 5. However, if one takes a relationship CONTAINS 323 into account, the value "High" in the skill 320 is better than "Medium" and will result in a different Work Request result 363. Similarly, if one takes a relationship CONTAINS 324 into account, the value "Very High" in the skill 320 is better than "High" and will result in a different result 364. Therefore, all these work requests will successfully match the query.

In a further example, a more complex query operation is performed by the metadata management system that considers the inter-concept relationships 14 among metadata 11, for example, by specifying a customized relationship INVERSE OF 332 in the context of an example metadata item Operating system 330 in the semantic search method, there may be found a plethora of work request result sets 365, 366, 367, for example, corresponding to search results that include non-Unix-type operating systems, e.g., Windows, Linux, Solaris, respectively. The user may customize which kinds of relationships 14 should be taken into account and the result set is different according to the customization. It is understood that the "INVERSE_OF" relationship generally is effective in some query, e.g., such as "NOT" something.

In a further example, for instance, when considering a relationship SUBTYPE_OF in the context of an example metadata item Development track 340 in the semantic search method, there may be found search result (work request) sets 368, 369, for example, corresponding to search results that include Asset development sub-types, e.g., C++, Java, respectively.

In the example work request search example 300 depicted in FIG. 5, task the metadata query processor constructs a graph of relationships among metadata which relationship is depicted as lines 121 interconnecting the various results of the searches. The graph forms the search space when considering all these relationships. Therefore, the query not only generates the results exactly matching the given keywords, but also does the reasoning based on the selected relationships. In other words, more results are obtained after running the query. A user can define the relationship(s) he/she is interested in that user's profile. Then it generates a specific sub-search space for him/her.

FIG. 6 illustrates an example resultant sub-search space 380 commensurate with the example complex work request query submitted by a user as shown in connection with the example queries 300 depicted in FIG. 5. As shown in FIG. 6 for illustrative purposes, an example query may be directed to a user specified relationship of the type "skill" 320 and "development track" 340. They help in determining which edges to follow for each part of the query. For example, the search query 384 includes finding "Medium" Skill 321 for "Asset Development" 341 when considering, for example, "SUBTYPE_OF", "EQUAL_TO", "CONTAINS" relationships. In the results shown in FIG. 6, the two metadata queries were unconnected and lead to unconnected results 385 with query based on "Medium" Skill metadata 321 and relationships EQUAL_TO 322 and CONTAINS 323, 324 taken into account; and results 390 with query based on "Asset Development" metadata 341 and relationships SUBTYPE_OF 342, 343 taken into account. It is noted in FIG. 6, the relationship between "Java" and "C++" which are semantically similar in an approximate sense. Now, even if the query was for C++ skill, and the user was fine with an inexact result, the result Java could be returned for this query.

In one embodiment, the metadata management system of FIG. 1 can be operated in conjunction with a conventional search engine. When used with a conventional search engine, the metadata management system of FIG. 1 can be used to narrow down the search space on which now the conventional search engine can perform its processing.

Figure 8:
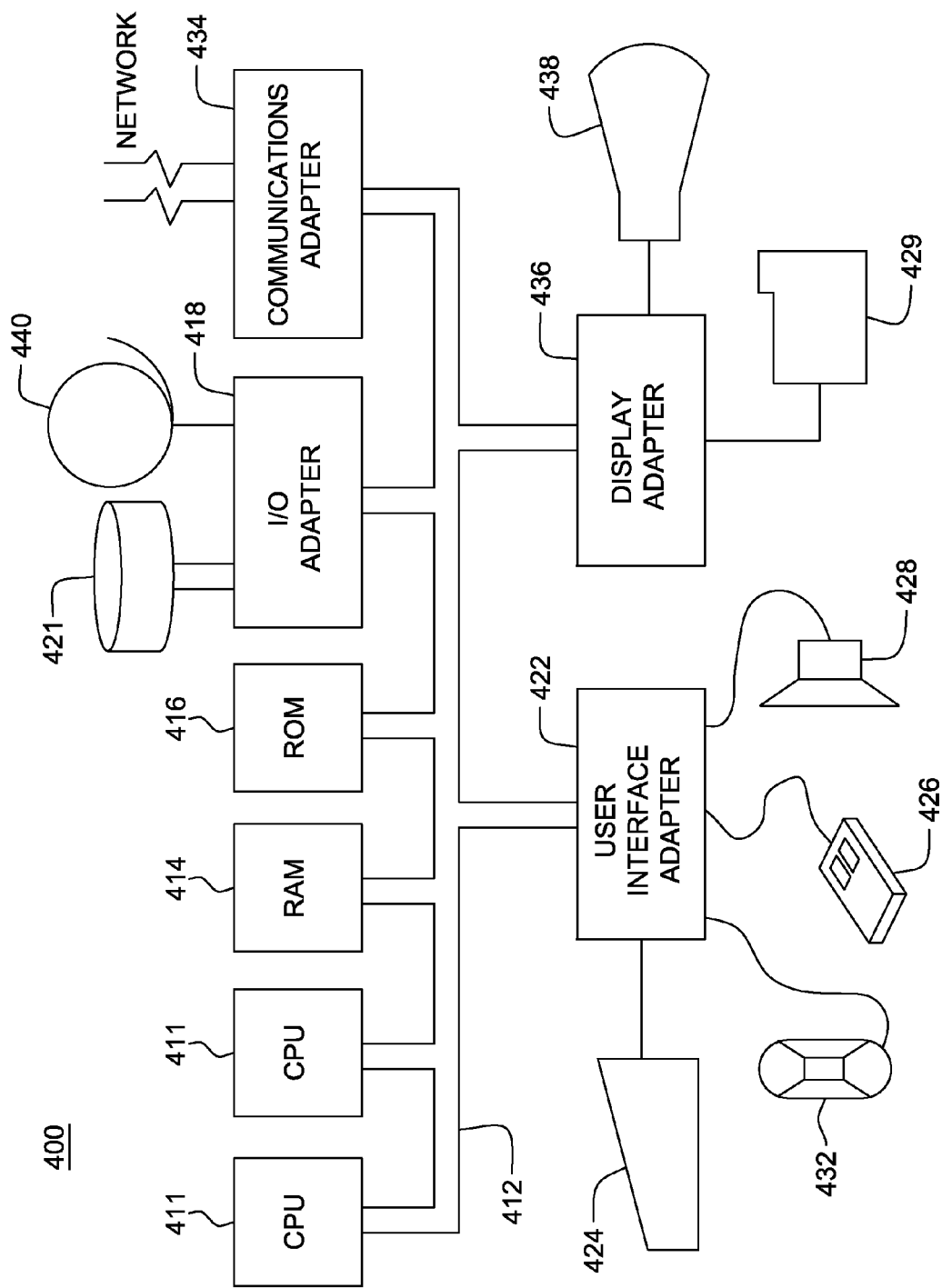

FIG. 8 illustrates an exemplary hardware configuration of a computing system 400 running and/or implementing the method steps in FIGS. 2, 3, 4. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system for retrieving data comprising:
   a memory storage device defining a meta-data repository that stores at least one meta-data item belonging to each of an element and a relationship type meta-data;
   a processor device in communications with the memory storage device, wherein the system is capable of performing a method comprising:
   storing, in the meta-data repository, at least one meta-data item belonging to each of an element type and a relationship type meta-data;
   storing at least one data item in a data repository;
   capturing a relationship between the at least one meta-data item and a data item including a context in which the relationship was generated;
   extracting, from data items stored in said data repository, said meta-data items;
   aggregating data and meta-data items and relationships thereof across one or more users in a structured file format;
   parsing the structured file format to extract data representing concepts, and to extract relationships;
   using a profile editor tool to permit a user, via a connected user device, to select relationships from the extracted relationships, the selected relationships being relationships that the user wants to consider during data queries;
   recording said user's selections as a profile for that user; and
   retrieving, in response to a user query comprising at least requested data items, relevant data items by parsing said user profile to dynamically determine kinds of relationships a user wants to consider, and obtaining relevant relationships based on said user profile and said requested data items, wherein a selection of meta-data used in the retrieving is determined according to said user profile and the captured context information;

wherein the selection of meta-data further includes contextual information about the retrieval query; and wherein the contextual information about the retrieval query further includes a description of when the query was generated.

2. The system as claimed in claim 1, where the contextual information about the retrieval query further includes a description of one or more of: by who or where the query was generated.

3. The system as claimed in claim 1, further comprising: a user interface via which a user customizes the relationships among the meta-data items specified in said user's profile, wherein said user customizes the relationships among the meta-data items in said user profile via said user interface in real-time.

4. The system as claimed in claim 3, wherein, via said user interface, said user is enabled to change the customization on relationships specified in said user's profile, by re-configuring the user's selection without disrupting the meta-data repository.

5. The system as claimed in claim 3, wherein the system is capable of further performing:
   storing said extracted concepts in the meta-data repository and storing a relationship type meta-data item in a semantic support representation.

6. The system as claimed in claim 1, wherein a relationship among one or more meta-data items includes EQUAL_TO, CONTAINS, INVERSE_OF, SUBTYPE_OF, LARGER_THAN, and SMALLER_THAN.

7. The system as claimed in claim 5, wherein said semantic support representation is based on a Resource Description Framework specification.

8. The system as claimed in claim 7, wherein said structured file format includes an extensible markup language format.

9. The system as claimed in claim 1, wherein said metadata store meta-data repository includes a relational data store.

10. A method for retrieving data comprising:
    storing, in a meta-data repository, at least one meta-data item belonging to each of an element type and a relationship type meta-data;
    storing at least one data item in a data repository;
    capturing a relationship between the at least one meta-data item and a data item including a context in which the said relationship was generated;
    extracting, from data items stored in said data repository, said meta-data items;
    aggregating data and meta-data items and relationships thereof across one or more users in a structured file format;
    parsing the structured file format to extract data representing concepts, and to extract relationships;
    using a profile editor tool to permit a user, via a connected user device, to select relationships from the extracted relationships, the selected relationships being relationships that the user wants to consider during data queries;
    recording said user's selections as a profile for that user;
    retrieving, in response to a user query comprising at least requested data items, relevant data items by parsing said user profile to dynamically determine kinds of relationships a user wants to consider, and obtaining relevant relationships based on said user profile and said requested data items, wherein a selection of meta-data used in the retrieving is determined according to said user profile and the captured context information,
    wherein a processor unit runs a program to execute one or more of said storing, capturing, using and retrieving;
    wherein the selection of meta-data further includes contextual information about the retrieval query; and
    wherein the contextual information about the retrieval query further includes a description of when the query was generated.

11. The method as claimed in claim 10, further comprising: providing a user interface via which a user customizes the relationships among the concepts.

12. The method as claimed in claim 11, wherein a user customizes the relationships among the meta-data via said user interface in real-time.

13. The method as claimed in claim 10, further comprising:
    enabling, via said user interface, said user to change the customization on relationships specified in said user's profile by re-configuring the user's selection without disrupting the meta-data repository.

14. The method as claimed in claim 10, further comprising:
    storing said extracted concepts in the meta-data repository and storing a relationship type meta-data item in a semantic support representation.

15. The method as claimed in claim 10, wherein a relationship among one or more meta-data items includes EQUAL_TO, CONTAINS, INVERSE_OF, SUBTYPE_OF, LARGER_THAN, and SMALLER_THAN.

16. The method as claimed in claim 14, wherein said semantic support representation is based on a Resource Description Framework specification.

17. The method as claimed in claim 14, wherein said structured file format includes an extensible markup language format.

18. The method as claimed in claim 14, wherein said meta-data store the meta-data repository includes a relational data store.

19. A computer program product for retrieving data, the computer program product comprising:
    a storage device readable by a processing circuit and storing instructions for execution by the processing circuit for performing a method comprising:
    storing, in a meta-data repository, at least one meta-data item belonging to each of an element type and a relationship type meta-data;
    storing at least one data item in a data repository;
    capturing a relationship between the at least one meta-data item and a data item including a context in which the said relationship was generated;
    extracting, from data items stored in said data repository, said metadata meta-data items;
    aggregating data and meta-data items and relationships thereof across one or more users in a structured file format;
    parsing the structured file format to extract data representing concepts, and to extract relationships;
    using a profile editor tool to permit a user, via a connected user device, to select relationships from the extracted relationships, the selected relationships being relationships that the user wants to consider during data queries;
    recording said user's selections as a profile for that user;
    retrieving, in response to a user query comprising at least requested data items, relevant data items by parsing said user profile to dynamically determine kinds of relationships a user wants to consider, and obtaining relevant relationships based on said user profile and, said requested data items, wherein a selection of meta-data used in the retrieving is determined according to said user profile and the captured context information,
    wherein a processor unit runs a program to execute one or more of said storing, capturing, using and retrieving;

wherein the selection of meta-data further includes contextual information about the retrieval query; and wherein the contextual information about the retrieval query further includes a description of when the query was generated.

* * * * *